United States Patent
De Cnodder et al.

(10) Patent No.: US 8,396,010 B2
(45) Date of Patent: Mar. 12, 2013

(54) SELF-CONFIGURATION OF A FORWARDING TABLE IN AN ACCESS NODE

(75) Inventors: Stefaan Jozef De Cnodder, Antwerp (BE); Patrick Mensch, Edegem (BE)

(73) Assignee: Alcatel Lucent, Paris (FR)

( * ) Notice: Subject to any disclaimer, the term of this patent is extended or adjusted under 35 U.S.C. 154(b) by 224 days.

(21) Appl. No.: 12/588,533

(22) Filed: Oct. 19, 2009

(65) Prior Publication Data
US 2010/0103936 A1    Apr. 29, 2010

(30) Foreign Application Priority Data
Oct. 29, 2008    (EP) .................................... 08291016

(51) Int. Cl.
*H04L 12/28*    (2006.01)
(52) U.S. Cl. ........ 370/254; 370/392; 370/400; 709/220; 709/250
(58) Field of Classification Search ........................ None
See application file for complete search history.

(56) References Cited

U.S. PATENT DOCUMENTS
2004/0111640 A1* 6/2004 Baum ........................... 713/201
2008/0301269 A1  12/2008 Shi

FOREIGN PATENT DOCUMENTS
| | | |
|---|---|---|
| CN | 1859407 | 11/2006 |
| EP | 1 986 386 | 10/2008 |
| WO | WO 2004/025926 | 3/2004 |
| WO | WO 2004/071027 | 8/2004 |

OTHER PUBLICATIONS
IEEE Standards: "IEEE Standard for Local and Metropolitan Area Networks: Overview and Architecture" IEEE Computer Society, Sponsored by the LAN/MAN Standards Committee, Mar. 8, 2002, pp. 1-36.
David C. Plummer, "Ethernet Address Resolution Protocol—or—Converting Network Protocol Addresses to 48.bit Ethernet Address for Transmission on Ehternet Hardware" Nov. 1982.

* cited by examiner

*Primary Examiner* — Brian Roberts
(74) *Attorney, Agent, or Firm* — Harness, Dickey & Pierce

(57) ABSTRACT

The present invention relates to an access node (2a, 2b) comprising:
   a forwarding mean (31) adapted to forward data traffic according to a forwarding table (32) that comprises one-to-one associations between destination hardware addresses and respective egress interfaces,
   a forwarding configuration means (33) adapted to configure forwarding entries into the forwarding table,
   a capturing means (34) adapted to capture auto-configuration messages exchanged between an auto-configuration server (4) and subscriber devices for assigning network addresses thereto.

An access node according to the invention is characterized in that the forwarding configuration means is coupled to the capturing means, and is further adapted to synchronize the configuration of a particular forwarding entry related to a particular hardware address (MAC@1) of a particular subscriber device (1) with the lease of a particular network address (IP@1) to the particular subscriber device.

The present invention also relates to a method for self-configuring a forwarding table (32) in an access node (2a, 2b).

8 Claims, 3 Drawing Sheets

SELF-CONFIGURATION OF A FORWARDING TABLE IN AN ACCESS NODE

Local Area Networks (LAN) were originally made up of stations (or hosts) connected to each other via a shared transmission medium. Data are encapsulated into frames, next frames are encoded into physical signals for transmission over the transmission medium (possibly via multiple physical paths). One station at most can be transmitting at a given time, while the other stations are listening. Each station is provided with Medium Access Control (MAC), and in particular with signal collision detection, frame delineation, unicast or multicast addressing, and protection against signal corruption.

A repeater (or hub) is a device used to interconnect segments of a transmission medium, thereby extending the range of a LAN when its physical specifications would otherwise be exceeded.

A bridge (or switch) is a device used to interconnect two or more LANs. A bridged LAN can provide for the following:
- communication between stations attached to LANs of different MAC types,
- an increase in the total throughput of a LAN,
- an increase in the physical extent of, or number of permissible attachments to, a LAN,
- partitioning of the physical LAN for engineering or administrative reasons, e.g. by means of Virtual LAN (ULAN) tags.

An example of a bridged LAN with different MAC types and network topology is given in §6.3.2.6 of the document entitled "*IEEE Standard for Local and Metropolitan Area Network: Overview and Architecture*", ref. 802, published by the Institute of Electrical and Electronics Engineers (IEEE) on Mar. 8, 2002.

The Request For Comment (RFC) entitled "*An Ethernet Address Resolution Protocol*", ref. 826, published in November 1982 by the Internet Engineering Task Force (IETF), discloses a method that allows stations exchanging data over a LAN or a bridged LAN to learn each other's hardware (or physical) address, such as a MAC address, based on their network (or logical) address, such as an IP address. An hardware address uniquely identifies a particular destination or a particular source over a LAN or a bridged LAN. A sending station that wishes to send data to a particular target station, which is assigned a particular network address, broadcasts a request to resolve that particular network address into a hardware address. The station that is assigned that particular network address answers the request with its hardware address. The request further comprises the sending station's network and hardware addresses, thereby allowing the listening stations to learn this association. Once each other's hardware addresses are known, peer-to-peer communication is possible.

The present invention primarily relates to Metropolitan Area Networks (MAN), and further to access (or aggregation) networks that span a geographical area, and provide users with an access towards network service providers and further towards application service providers for a wide variety of end-user applications (or services), such as file transfer, electronic mail, web browsing, voice and video communication, multimedia applications, database access, transaction processing, remote process control, etc.

The present invention more specifically relates to an access node, which is a network unit at the edge of the aggregation network that couples subscribers to the aggregation network, and further to the core network. An example of an access node is a Digital Subscriber Line Access Multiplexer (DSLAM), an Optical Network Unit (ONU), a wireless base station, etc.

In a Layer 2 (L2) aggregation network, such as an Ethernet MAN (EMAN), the access node accommodates or emulates a bridge. A bridge makes use of the self-learning forwarding paradigm to forward traffic to the right destination: the forwarding table is populated on the fly by decoding the source MAC addresses of incoming frames, and by configuring these MAC addresses as being bound to (or associated with) the respective ports (or interfaces, being of physical or logical nature) through which the incoming frames were received. The association is deleted after some ageing timer expires.

Upon receipt of an incoming frame, the bridge determines the egress port by means of a table lookup with the destination MAC address of that frame. If no match is found, meaning if the destination MAC address has not yet been learned as being bound to a particular port, then the frame is either discarded or flooded towards all the egress ports, depending on the configured policy.

For security issues, downstream frames bound to an unknown hardware address are typically discarded in an access node, meaning that no session setup is possible from the network if the subscriber's hardware address has not been learnt first from an upstream frame, or if the subscriber's hardware address ages out and no upstream traffic has been received since.

Large ageing timers partially solve the problem. Another option is to configure a small ARP ageing timer on the edge router, such that it periodically ARPs the subscriber devices: the ARP reply will trigger the MAC address learning. However, configurable ARP timers are generally not available, and short timers causes too much broadcast traffic in large aggregation networks.

It is an object of the present invention to allow incoming connections to be established from the network side, as well as to enhance the security standards, while remaining as easy to configure as the self-learning forwarding paradigm is.

The objectives of the present invention are achieved and the aforementioned shortcomings of the prior art are overcome by an access node comprising:
- a forwarding mean adapted to forward data traffic according to a forwarding table that comprises one-to-one associations between destination hardware addresses and respective egress interfaces,
- a forwarding configuration means adapted to configure forwarding entries into said forwarding table,
- a capturing means adapted to capture auto-configuration messages exchanged between an auto-configuration server and subscriber devices for assigning network addresses thereto, wherein said forwarding configuration means is coupled to said capturing means, and is further adapted to synchronize the configuration of a particular forwarding entry related to a particular hardware address of a particular subscriber device with the lease of a particular network address to said particular subscriber device.

Examples of auto-configuration messages are Dynamic Host configuration Protocol (DHCP) messages, and an example of an auto-configuration server is a DHCP server.

By synchronizing the bounding of a particular hardware address to a particular subscriber port with the lease of a particular network address to the corresponding subscriber device holding that particular hardware address and coupled to that particular port, and by making sure that such a bounding is in force throughout the course of the lease, one prevents ageing out an hardware addresses while the corresponding subscriber is still logically attached to the network, thereby allowing incoming connections from the network to be established at whatever time, e.g. for remote management of the subscriber device.

The invention is further advantageous in that hardware address spoofing gets even more difficult.

A further embodiment of an access node according to the invention is characterized in that said forwarding configuration means is further adapted to pause, respectively to resume, a particular ageing timer related to said particular forwarding entry upon the assignment, respectively the release, of said particular network address to said particular subscriber device.

This embodiment is particularly advantageous as it comes on top of the self-learning forwarding paradigm. The very first message exchanged between the auto-configuration server and the subscriber device causes a new forwarding entry to be added into the forwarding table, and a corresponding ageing timer to be started. Upon assignment of a network address to that subscriber device, the ageing timer is frozen. Upon release of that network address, being the expiry of the lease timer, or an explicit release from either the subscriber device or the auto-configuration server, the ageing timer resumes. The forwarding entry is removed from the forwarding table when the ageing timer expires.

An alternative embodiment of an access node according to the invention is characterized in that said forwarding configuration means is further adapted to add, respectively to delete, said particular forwarding entry upon the assignment, respectively the release, of said particular network address to said particular subscriber device.

Once a network address is validly assigned to a subscriber, a forwarding entry is added for the corresponding hardware address, and traffic from/to that subscriber starts flowing through the bridge. Once the network address is released, the corresponding forwarding entry is removed, causing any traffic except DHCP traffic to be discarded (DHCP traffic is typically forwarded by means of DHCP contextual information). In this embodiment, the self-learning paradigm is superseded by the addition and removal of quasi-static forwarding entries (or semi-permanent forwarding entries, i.e. that do not age out during the lease time) in synchronization with respectively the assignment and the release of network addresses.

The present invention also relates to a method for configuring a forwarding table of an access node, and comprising the steps of:
  configuring forwarding entries in a forwarding table that comprises one-to-one associations between destination hardware addresses and respective egress interfaces,
  capturing auto-configuration messages exchanged between an auto-configuration server and subscriber devices for assigning network addresses thereto,
wherein said method further comprises the steps of synchronizing the configuration of a particular forwarding entry related to a particular hardware address of a particular subscriber device with the lease of a particular network address to said particular subscriber device.

Embodiments of a method according to the invention correspond with the embodiments of an access node according to the invention.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Finally, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The above and other objects and features of the invention will become more apparent and the invention itself will be best understood by referring to the following description of an embodiment taken in conjunction with the accompanying drawings wherein.

Figure 1:
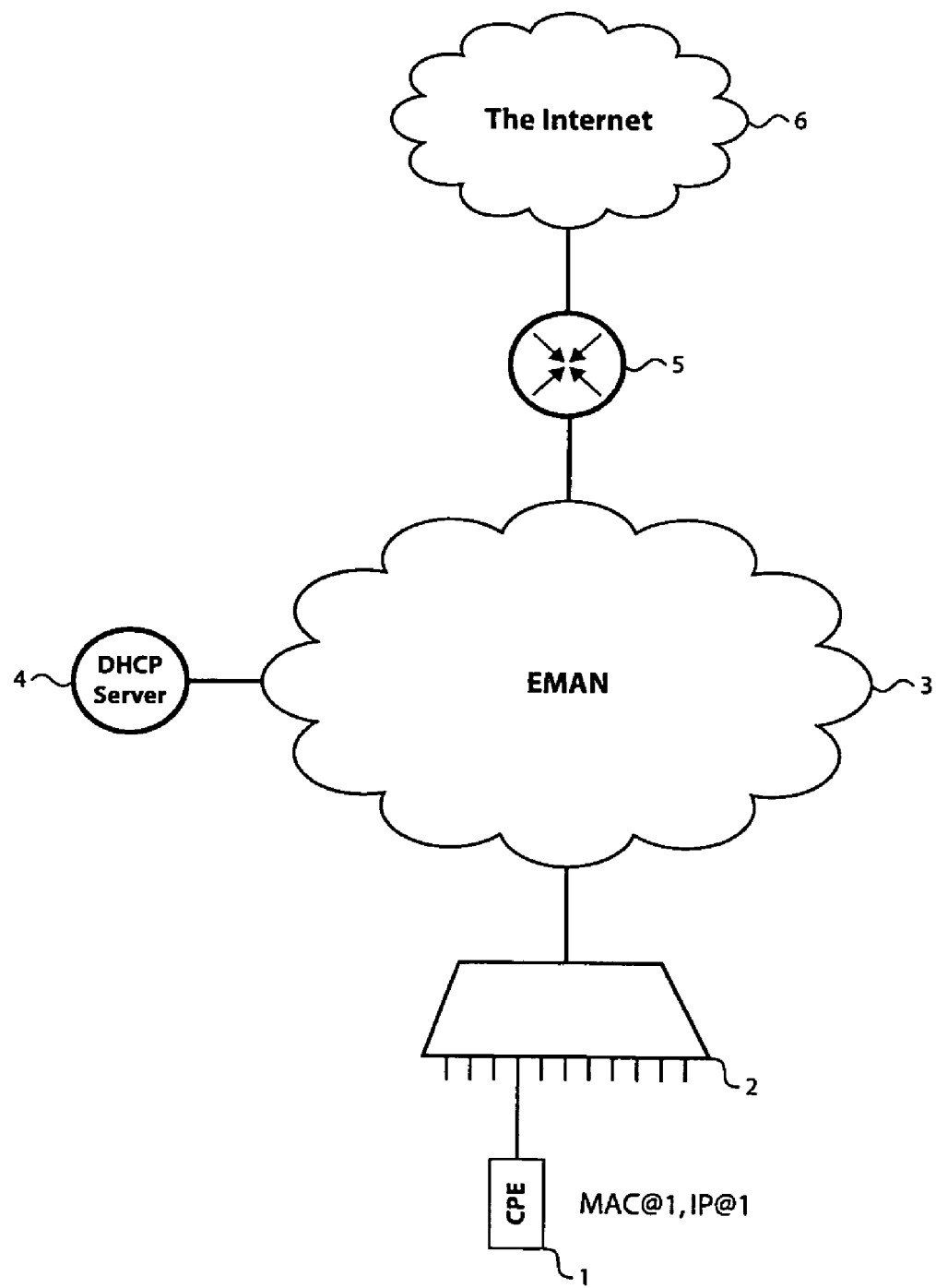
FIG. 1 represents an aggregation network.

There is seen in FIG. 1 a data communication system comprising a subscriber device 1 (CPE), an access node 2, an Ethernet-based aggregation network 3 (EMAN), a DHCP server 4, an edge router 5 and the Internet 43.

The subscriber device 1 is coupled to the access node 2. The access node 2, the DHCP server 4, the edge router 5 are coupled to the aggregation network 3. The edge router 5 is further coupled to the Internet 6.

The DHCP server 4 is adapted to allocate network addresses and to deliver configuration parameters to dynamically configured client hosts. The DHCP server 4 assigns an IP address to a client for a limited period of time (or until the client explicitly relinquishes the address). Dynamic allocation allows automatic reuse of an address that is no longer needed by the client to which it was assigned. Thus, dynamic allocation is particularly useful for assigning an address to a client that will be connected to the network only temporarily, or for sharing a limited pool of IP addresses among a group of clients that do not need permanent IP addresses.

Figure 2:
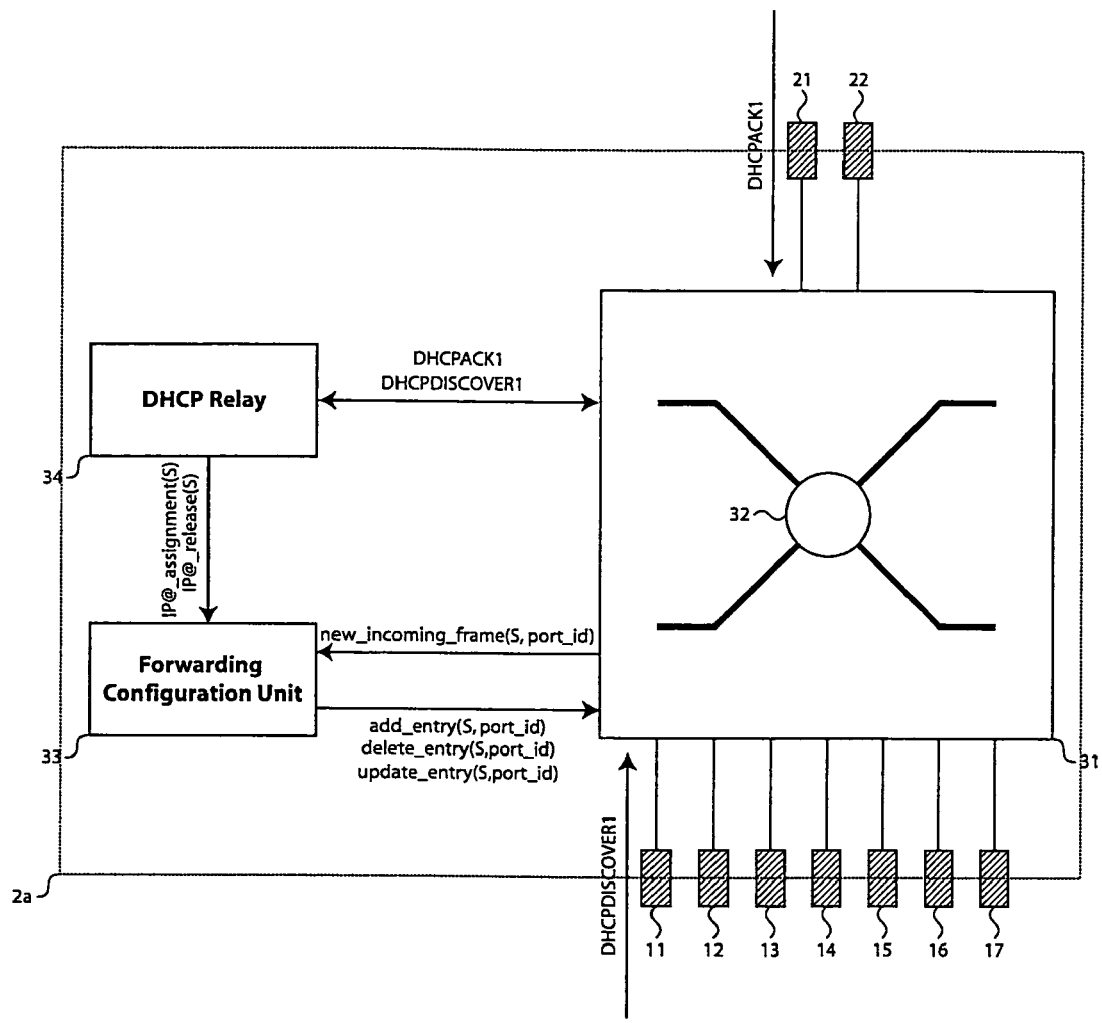
FIG. 2 represents a first embodiment of an access node according to the invention.

There is seen in FIG. 2 an access node 2a according to the invention comprising the following functional blocks:
  subscriber I/O ports 11 to 17 for coupling through wireline or wireless transmission to subscriber devices, such as modems, gateways, routers, personal computers, set top boxes, mobile or wireless terminals, etc,
  network I/O ports 21 and 22 for coupling to an aggregation network,
  an Ethernet switch 31 including a forwarding table 32,
  a forwarding configuration unit 33,
  a DHCP (or BOOTP) relay agent.

The Ethernet switch 31 is coupled to the subscriber ports 11 to 17, to the network ports 21 and 22, to the forwarding configuration unit 33, and to the DHCP relay agent 34. The forwarding configuration unit 33 is further coupled to the DHCP relay agent 34.

The Ethernet switch 31 is adapted to switch any incoming Ethernet frame from any ingress port towards any egress port. Upon receipt of a new incoming frame, the Ethernet switch 31 determines the egress port by means of a table lookup with the destination MAC address of that frame. If no match is found, then the frame is discarded (downstream) or flooded (upstream).

The Ethernet switch 31 is further adapted to trigger (see new_incoming_frame (S, port_id) message) the forwarding configuration unit 33 whenever a new incoming Ethernet frame has a source MAC address that is not associated yet with the ingress port (that is to say, the port through which the frame has been received). The trigger includes both the source MAC addresses (S) and a logical identifier of the ingress port (port_id).

The Ethernet switch 31 is further adapted to redirect DHCP traffic towards the DHCP relay agent 34 for further handling through e.g. an Application Programming Interface (API). Once the captured DHCP traffic is processed according to the invention, it is returned to the Ethernet switch 31 for further forwarding, possibly through a specified egress port.

The forwarding table 32 maintains one-to-one relationships between learned source MAC addresses and respective port identifiers.

The forwarding configuration unit 33 is adapted to configure the forwarding table 32 based on the triggers received from both the Ethernet switch 31 and the DHCP relay agent 34.

More specifically, the forwarding configuration unit 33 either writes a new forwarding entry (see add_entry (S, port_id) message between the forwarding configuration unit 33 and the Ethernet switch 31) associating a particular source MAC address (S) with a particular port identifier (port_id), or delete an existing forwarding entry (see delete_entry (S, port_id) message), or update an existing forwarding entry (see update_entry(S, port_id) message) by re-associating a learned MAC address to another port identifier.

The forwarding configuration unit 33 is further adapted to start an ageing timer whenever a new entry is added or an existing entry is updated, and to delete the corresponding association once this timer expires.

The forwarding configuration unit 33 is further adapted to pause, respectively to resume, the ageing timer corresponding to a particular forwarding entry, which associates a particular hardware address with a particular port identifier, in synchronization with the assignment, respectively the release, of a network address to the particular subscriber device that holds that particular hardware address and that is coupled to that particular port. The synchronization triggers are issued by the DHCP relay agent 34.

The DHCP relay agent 34 is adapted to relay any DHCP message from a client device towards the DHCP server 4, and vice-versa (see DHCP_traffic in FIG. 2). The DHCP relay agent 34 implements a BOOTP relay agent as described in RFC 951 entitled "BOOTSTRAP PROTOCOL (BOOTP)" published in September 1985 by the IETF.

The DHCP relay agent 34 is further adapted to trigger the forwarding configuration unit 33 upon capture of a DHCPACK message whereby a particular subscriber device is validly assigned an IP address (see IP@_assignment(S) message, wherein S denotes the MAC address of the corresponding subscriber device as read from chaddr field in DHCPACK message).

The DHCP relay agent 34 is further adapted to start a timer, the value of which matches the IP lease time as encoded in the DHCP option field of DHCPACK message. Upon timer expiry, the DHCP relay agent 34 informs the forwarding configuration unit 33 about the release of the corresponding IP address (see IP@_release(S) message). So does the DHCP relay agent 34 upon capture of a DHCPRELEASE message, whereby a subscriber device releases its previously assigned IP address, or upon capture of a DHCPFORCERENEW message, whereby the DHCP server 4 forces a subscriber device to release its previously assigned IP address.

An operation of this embodiment follows with reference to the subscriber device 1, which is assumed to be coupled to the subscriber port 11 of the access node 2a.

Initially, the subscriber device 1 (more specifically, a DHCP client housed by the subscriber device 1) initiates a DHCP session to obtain network configuration parameters from a DHCP server. The network configuration parameters includes an IP address, primary and secondary Domain Name Server's (DNS) IP addresses, a gateway's IP address, a subnet mask, etc.

The DHCP session is initiated by broadcasting a DHCPDISCOVER message, presently DHCPDISCOVER1, with the MAC address of the subscriber device 1 as source MAC address, presently MAC@1, and with the broadcast MAC address FF:FF:FF:FF:FF:FF as destination MAC address.

The Ethernet switch 31 identifies DHCPDISCOVER1 message as a DHCP message (e.g., by examination of UDP client/server port number), and thus delivers DHCPDISCOVER1 message to the DHCP relay agent 34.

The DHCP relay agent writes its one IP address into giaddr field of DHCPDISCOVER1 message, and requests the Ethernet switch 31 to forward DHCPDISCOVER1 message through a specified network port towards the DHCP server 4.

Concurrently, the Ethernet switch 31 triggers the forwarding configuration unit 33 as the source MAC address of DHCPDISCOVER1 message, presently MAC address MAC@1, is not yet associated with the port through which DHCPDISCOVER1 message has been received, presently the subscriber port 11.

The forwarding configuration unit 33 writes a new forwarding entry in the forwarding table 32 whereby MAC address MAC@1 is bound to port 11 (see add_entry(S, port_id) with presently S=MAC@1 and port_id=11), and starts a new ageing timer T1.

The DHCP session goes on by exchanging further DHCP messages (DHCPOFFER, DHCPREQUEST; not shown), and terminates with the DHCP server 4 returning a DHCPACK message, presently DHCPACK1, to the DHCP client. DHCPACK1 message contains an IP address IP@1 assigned to the subscriber device 1, as well as an IP lease time, and is received by the access node 2a through the network port.

The Ethernet switch 31 delivers DHCPACK1 message to the DHCP relay agent 34. The DHCP relay agent 34 reads IP@1 and MAC@1 from ciaddr and chaddr fields of DHCPACK1 message respectively, and notifies the forwarding configuration unit 33 about the network address assignment (see IP@_assignment(S) message with presently S=MAC@1).

Concurrently, the DHCP relay agent 34 starts a lease timer T2, the value of which matches the value as read from the DHCP option field (lease time) of DHCPACK1 message.

Thereupon, the forwarding configuration unit 33 identifies the ageing timer T1 as being running for the forwarding entry related to MAC@1, and pauses this timer.

Eventually, the DHCP relay agent 34 substitutes the MAC address of the subscriber device 1 for the destination MAC address, and requests the Ethernet switch 31 to forward DHCPACK1 message towards the subscriber device 1.

upon expiry of timer T2, or upon receipt of either DHCPFORCERENEW or DHCPRELEASE message from the DHCP server 4 or the subscriber device 1 respectively, the DHCP relay agent 34 notifies the forwarding configuration unit 33 about the IP address release (see IP@_release (S) message with presently S=MAC@1).

Thereupon, the forwarding configuration unit 33 identifies the ageing timer T1 as being paused for the forwarding entry related to MAC@1, and resumes this timer. Upon expiry of timer T1, the forwarding entry related to MAC@1 ages out and is removed from the forwarding table 32 (see delete_entry(S, port_id) with presently S=MAC@1 and port_id=11).

Alternatively, the forwarding configuration unit 34 may stop the ageing timer T1 upon IP address assignment, and starts a new ageing timer T1' upon IP address release. Upon expiry of timer T1', the forwarding entry related to MAC@1 is removed from the forwarding table. This embodiment is rather advantageous in that no timer context need to be maintained.

Still alternatively, a DHCP snooper function may substitute for the DHCP relay agent 34. The DHCP snooper only gets a duplicate of the DHCP messages exchanged between the DHCP server 4 and the subscriber devices. The duplicates are not returned to the Ethernet switch 31 for further forwarding.

Figure 3:
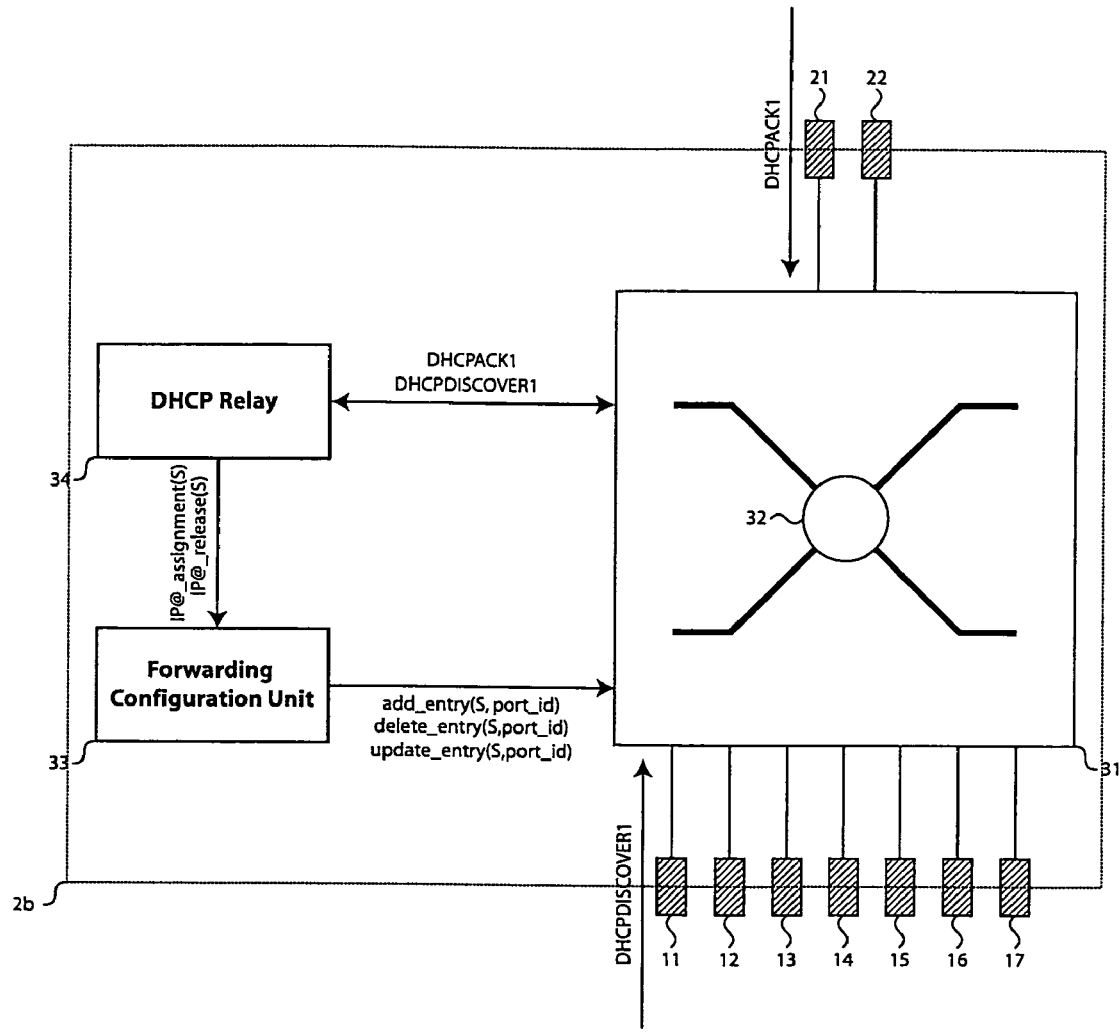
FIG. 3 represents a second embodiment of an access node according to the invention.

There is seen in FIG. 3 an alternative embodiment of an access node 2b according to the invention wherein the forwarding configuration unit 33 does not implement the self-learning forwarding paradigm (at least for the subscriber ports), and only relies on IP address assignment and release messages from the DHCP relay agent 34 for adding or deleting quasi-static forwarding entries to the forwarding table 32. The lease timer T2 is still started upon receipt of a DHCPACK message, and the forwarding entry is removed upon expiry of this timer, or upon release of the IP address by the DHCP server or the DHCP client.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. An access node comprising:
   a forwarding switch configured to forward incoming frames towards egress ports based on their destination hardware address and on a forwarding table that includes one-to-one associations between destination hardware addresses and respective egress interfaces,
   a forwarding configuration unit configured to write forwarding entries into said forwarding table, the forwarding configuration unit being at least part of an electronic component,
   a relay configured to capture auto-configuration messages exchanged between an auto-configuration server and subscriber devices for assigning network addresses thereto,
   wherein said forwarding configuration unit is coupled to said relay, and is further configured to synchronize the configuration of a particular forwarding entry of said forwarding table related to a particular hardware address of a particular subscriber device with the lease of a particular network address to said particular subscriber device.

2. An access node according to claim 1, wherein said forwarding configuration unit is further configured to pause a particular ageing timer related to said particular forwarding entry in synchronization with the assignment-of said particular network address to said particular subscriber device, and next to resume said particular ageing timer in synchronization with the release of said particular network address.

3. An access node according to claim 1, wherein said forwarding configuration unit is further configured to add said particular forwarding entry in synchronization with the assignment of said particular network address to said particular subscriber device and next to delete said particular forwarding entry in synchronization with the release of said particular network address.

4. The access node of claim 1, wherein the forwarding switch is configured to trigger the forwarding configuration unit whenever a new incoming frame has a source address that is not associated yet with the port through which the frame has been received.

5. A method for self-configuring a forwarding table in an access node, said method comprising:
   configuring forwarding entries in said forwarding table that includes one-to-one associations between destination hardware addresses and respective egress interfaces,
   capturing auto-configuration messages exchanged between an auto-configuration server and subscriber devices for assigning network addresses thereto,
   synchronizing the configuration of a particular forwarding entry of said forwarding table related to a particular hardware address of a particular subscriber device with the lease of a particular network address to said particular subscriber device,
   forwarding incoming frames towards egress ports based on their destination hardware address.

6. The method of claim 5, further comprising:
   pausing a particular ageing timer related to said particular forwarding entry of said forwarding table in synchronization with the assignment of said particular hardware address of said particular subscriber device
   resuming the particular ageing timer related to said forwarding entry of said forwarding table in synchronization with the release of said particular hardware address of said particular subscriber device.

7. The method of claim 5, further comprising:
   adding a particular forwarding entry in synchronization with the assignment of said particular hardware address to said particular subscriber device
   deleting the particular forwarding entry in synchronization with the release of said particular hardware address.

8. The method of claim 5, further comprising:
   triggering the configuration of a particular forwarding entry of said forwarding table whenever a new incoming frame has a source address that is not associated yet with the port through which the frame has been received.

* * * * *